United States Patent [19]

Black

[11] 4,064,969
[45] Dec. 27, 1977

[54] OIL DRAIN BAG

[76] Inventor: Charles A. Black, 777 S. Lawrence St., Montgomery, Ala. 36101

[21] Appl. No.: 738,833

[22] Filed: Nov. 4, 1976

[51] Int. Cl.² ............................................. F16N 33/00
[52] U.S. Cl. .................................... 184/1.5; 184/106; 248/99
[58] Field of Search ................ 184/1.5, 106; 141/114, 141/390, 391, 338; 248/95, 97, 98, 99

[56] References Cited

U.S. PATENT DOCUMENTS

| 3,122,397 | 2/1964 | Mintz | 248/97 X |
|---|---|---|---|
| 3,240,457 | 3/1966 | Backlund et al. | 248/99 |
| 3,260,488 | 7/1966 | Kliewer et al. | 248/99 |
| 3,610,560 | 10/1971 | Dillabough | 248/97 |
| 3,659,816 | 5/1972 | Wilson | 248/97 |
| 3,687,408 | 8/1972 | Lake | 248/97 |
| 3,874,478 | 4/1975 | Mantell | 184/1.5 |
| 3,905,406 | 9/1975 | Cruse | 141/390 |
| 3,954,250 | 5/1976 | Grace | 184/1.5 X |
| 3,967,697 | 7/1976 | Guenther | 184/1.5 |

OTHER PUBLICATIONS

"Popular Mechanics," June 1974, p. 128.

*Primary Examiner*—David H. Brown
*Attorney, Agent, or Firm*—Hugh P. Carter

[57] ABSTRACT

A bag especially adapted to receive liquid, for instance, motor oil being drained from the internal combustion engine of an automobile. The bag is so constructed that the mouth of the same is held open and elevated above the general level of the bag when the bag is laid on the ground beneath the engine so that as oil runs into the mouth of the bag it is permitted to run into the body of the same, thus to be contained in the bag at a level lower than the upper portion of the mouth. Two embodiments are disclosed, both of which are provided with means to hold the mouth elevated above the level of the body of the bag, and both of which are foldable to permit the bag to be shipped or stored substantially flat.

3 Claims, 6 Drawing Figures

U.S. Patent  Dec. 27, 1977  Sheet 1 of 2  4,064,969
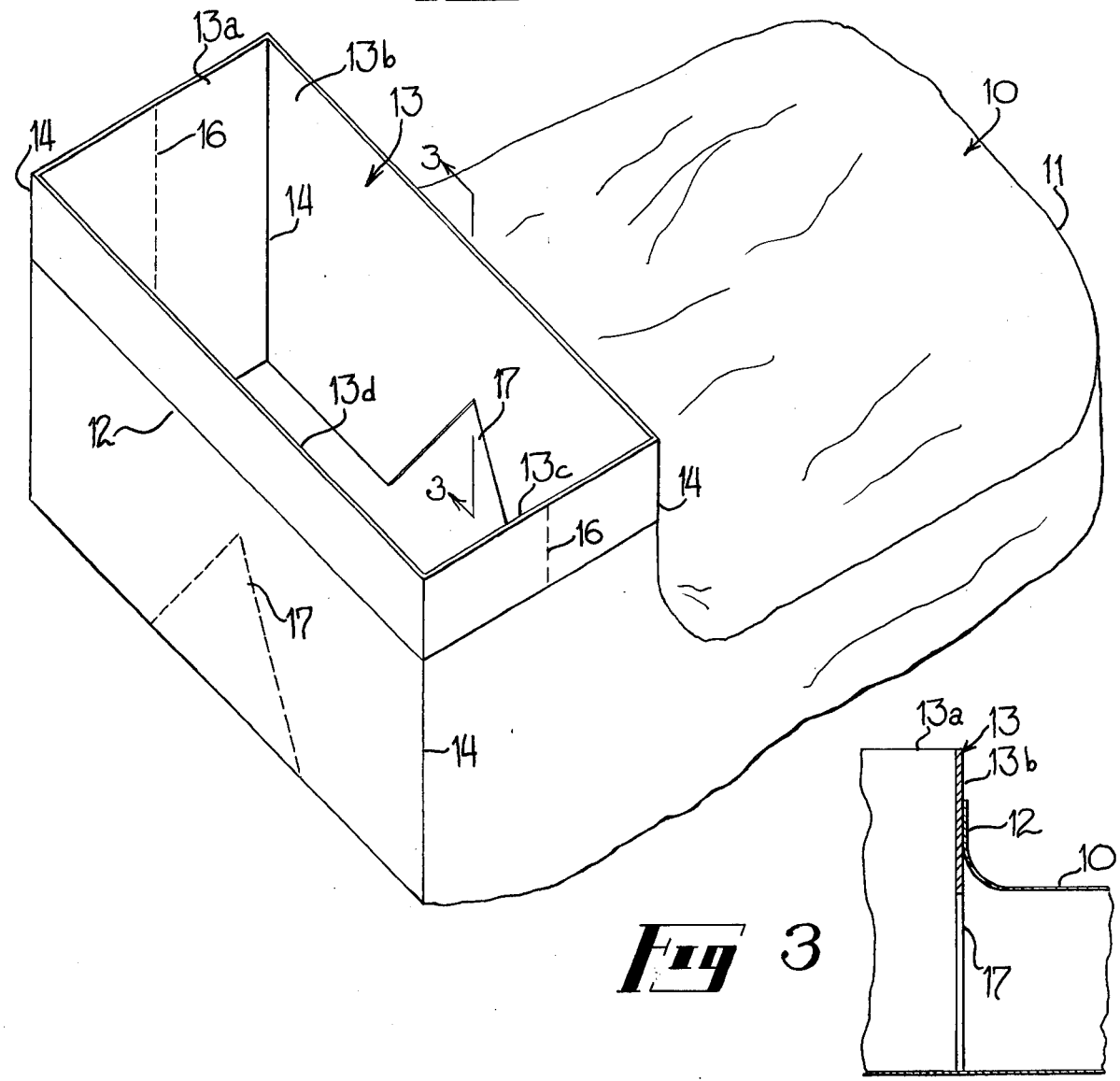

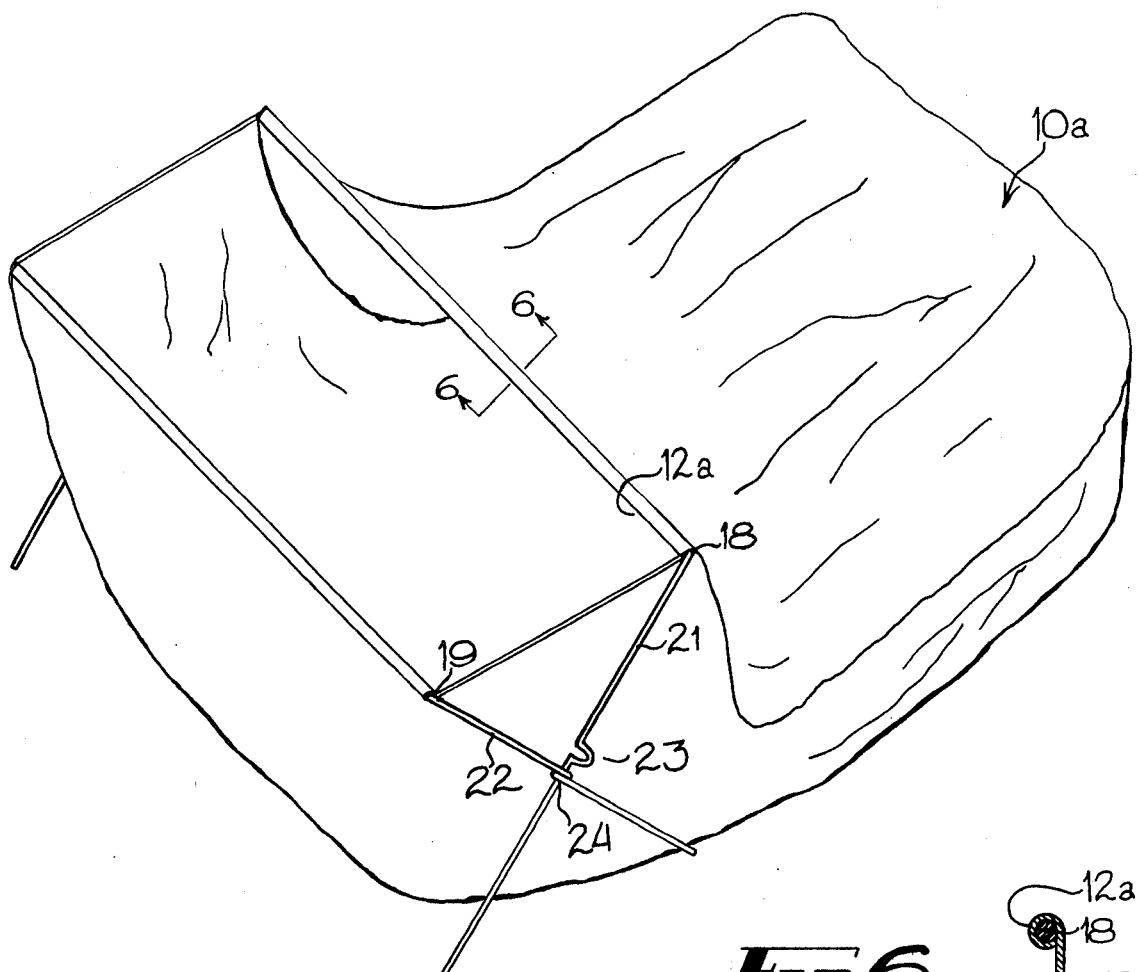
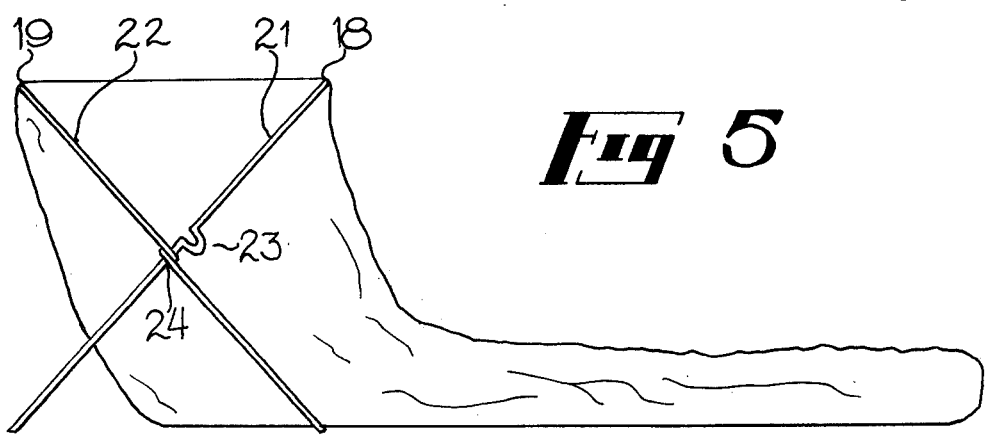

OIL DRAIN BAG

My invention relates to bags especially adapted to be used in draining oil from automobile engines and the like and has for an object the provision of a bag which may be placed on the ground, or on any substantially flat surface, beneath the automobile engine, with the mouth of the bag raised above the general level of the remainder of the body of the bag so that when the oil runs into the bag through the mouth it is partially filled while lying on its side.

Another object is to provide a disposable bag of the character indicated in which the mouth of the bag is provided with an envelope of relatively heavy material such as cardboard or the like, the cardboard embodying at least three sides, but preferably four, joined to each other along fold lines, and at least one of the sides, preferably two opposite ones, being capable of bending intermediate its or their ends, whereby the mouth of the bag may be folded in closed, flat, condition and which when unfolded, is held above the general level of the remainder of the body of the bag when lying on a flat surface.

Yet another object is to provide a bag of the character designated in which wire-like members may be used instead of the cardboard above mentioned, thus to hold the bag open, and in which the legs of the wire-like member are crossed and pivotally connected to permit the bag to be folded substantially flat.

An oil drain bag illustrating features of my invention is shown in the accompanying drawings in which:

FIG. 1 is an isometric view of one form of the same in set-up or oil receiving position;

FIG. 2 is a side elevational view of the bag shown in FIG. 1;

FIG. 3 is an enlarged detail sectional view taken generally along line 3—3 of FIG. 1;

FIG. 4 is a view corresponding to FIG. 1 but showing a different form of my invention;

FIG. 5 is a side elevational view of the bag shown in FIG. 4; and,

FIG. 6 is an enlarged detail fragmental view taken generally along line 6—6 of FIG. 1.

Referring now to the drawings for a better understanding of my invention and more particularly to FIGS. 1, 2 and 3, I indicate at 10 a bag which may be one of the usual liquid-proof plastic materials such as polyethylene or the like. The bag is adapted to be placed on the ground beneath the automobile engine and the mouth of the same is adapted to be held open as will be explained to receive the used motor oil as it drains from the crankcase opening. It will be understood that the bag is closed at its end 11, but open at the other end to provide a mouth 12.

Fitting into the mouth of the bag is a foldable member 13 which may be made of cardboard or other sheet material having a rigidity sufficient to stand upright as indicated when in the position shown in FIGS. 1 and 2. Thus, the mouth of the bag is secured to the member 13 as by glueing or otherwise attaching the same as indicated particularly in FIG. 3. Still further, member 13 comprises four wall sections 13a, 13b, 13c and 13d. The walls are joined to each other along corner score lines 14. The walls 13a and 13c are provided with score lines 16. Finally, the walls 13b and 13d are provided with V-shaped cutouts 17 for a purpose later to appear.

From the description given it will be seen that by pushing inwardly on the end walls 13a and 13c these walls fold inwardly about the respective score lines 13, permitting the member 13 to fold flat, since this brings the walls 13b and 13d close together. In this folded position the entire bag lies substantially flat so that the mouth of the bag lies substantially in the same place as does the remainder or body portion of the bag. With the member 13 spread apart as indicated in the drawings and when the bag is placed on a substantially flat surface, mouth 12 of the bag lies above the general level of the body as shown particularly in FIGS. 1 and 2. Thus, the member 13 serves not only to hold the mouth open, but also serves to elevate the mouth of the bag above the general level of the body so that as oil enters the mouth it may pass through the opening 17 into the bag. Due to the amount of sheet material from which the bag is formed, the bag is somewhat folded and creased in the empty condition depicted in the drawings. When oil flows into the body of the bag it causes the main body portion to expand, long prior to overflowing the mouth of the bag. When finished with the draining job, walls 13a and 13c are pushed inwardly, permitting walls 13b and 13d to come substantially close together, thus in effect closing the bag. The bag may now be lifted by this mouth reinforcing section, for disposal or otherwise.

The object in providing the cutout 17 in the wall 13d as well as providing the same in wall 13b is to permit the body of the bag to lie either to the right or left of the mouth as shown in FIG. 1.

In FIGS. 4 to 6, inclusive, I show another form of bag in which the body 10a may be substantially identical with the one shown in the other FIGS. Opposite side walls of the mouth 12a of this bag are secured about wire-like members 18 and 19. The member 18 is provided at each end with extensions or legs 21 and the member 19 is provided at each end with extensions or legs 22. These extensions are turned generally at right angles to their respective wire sections 18 and 19 but lie generally in the same place with each other, and consequently with the respective sections 18 and 19.

The extensions or leg members 21 are provided with U-shaped portions 23 as indicated in FIG. 5. Legs 22 are provided with loops 24 through which the lower ends of the leg members 21 loosely pass. The extent of the loops 24 and the U-shaped portions 23 are such that the crossed legs maybe folded sufficiently to permit the members 18 and 10 to come substantially together, whereby the mouth of the bag is folded flat.

The operation and function of the modification of FIGS. 4 to 6, inclusive, is the same as that previously disclosed. The members 18 and 19 together with their respective legs 21 and 22 serve to hold the bag mouth open, and also to hold it elevated above the general level of the body of the bag.

In view of the foregoing it will be seen that I have devised an improved bag especially adapted for use in draining fluids such as motor oil from vehicle engines and the like. My improved bag is economical of manufacture and hence may be a throw-away item. By providing means not only to hold the mouth of the bag open, but also to hold the mouth of the bag raised above the general level of the bag when lying on a substantially flat surface, I eliminate the necessity of special means to hang the bag with its mouth open. Further, by providing means to fold the portion of the bag which holds the mouth open and hold it elevated, the bag may be shipped flat and may be set up when desired.

While I have shown my invention in but two forms, it will be obvious to those skilled in the art that it is not so limited but is susceptible of various other changes and modifications without departing from the spirit thereof.

What I claim is:

1. In a container adapted to rest on a support beneath a spout, hole or the like to receive liquid therefrom,
   a. an elongated, flexible, sack-like body having a mouth and being of a size to contain a predetermined amount of liquid,
   b. a flat-foldable insert of substantially rigid material permanently attached to the inside of the mouth of the sack adjacent the upper end of the sack and extending into the sack a minor length of the body of the sack, said insert when unfolded forming a rigid column which holds the sack mouth open and holds the mouth of the sack above the level of the major length of the sack when the sack rests on a substantially flat surface, and
   c. the lower edge of the insert being unconnected to the sack body thereby forming a passage through which liquid may pass from the unfolded insert into the sack.

2. The container of claim 1 in which the insert is multi-sided, said sides being joined to each other along fold lines and at least two of the sides having fold lines intermediate their ends, whereby the envelope may be folded substantially flat.

3. The container set forth in claim 2 in which the side of the insert nearest the body of the sack has opening therein, thus to facilitate the flow of liquid into the body of the sack.

* * * * *